United States Patent [19]
Carli et al.

[11] Patent Number: 5,778,550
[45] Date of Patent: Jul. 14, 1998

[54] SYSTEM FOR DETECTING LINEAR DIMENSIONS AND METHOD FOR TESTING THE SYSTEM OPERABILITY

[75] Inventors: Carlo Carli; Andrea Ferrari, both of Ferrara, Italy

[73] Assignee: Marposs Societa' Per Azioni, Bentivoglio, Italy

[21] Appl. No.: 718,396

[22] PCT Filed: Apr. 6, 1995

[86] PCT No.: PCT/EP95/01261

§ 371 Date: Sep. 30, 1996

§ 102(e) Date: Sep. 30, 1996

[87] PCT Pub. No.: WO95/28615

PCT Pub. Date: Oct. 26, 1995

[30] Foreign Application Priority Data

Apr. 19, 1994 [IT] Italy .................. BO94A0167

[51] Int. Cl.$^6$ .................................................. G01B 7/00
[52] U.S. Cl. .................................... 33/503; 33/504
[58] Field of Search .................. 33/502, 503, 504, 33/505, 556, 557, 558, 559, 560, 561; 364/571.01, 578; 73/1.01, 1.79, 1.81

[56] References Cited

U.S. PATENT DOCUMENTS

| | | | |
|---|---|---|---|
| 4,437,151 | 3/1984 | Hurt et al. | 33/503 |
| 4,819,195 | 4/1989 | Bell et al. | 33/503 |
| 5,056,235 | 10/1991 | Thomas | 33/503 |
| 5,283,630 | 2/1994 | Yoshizumi | 33/505 |
| 5,501,096 | 3/1996 | Stettner et al. | 33/503 |
| 5,657,549 | 8/1997 | Shen et al. | 33/504 |

FOREIGN PATENT DOCUMENTS

| | | |
|---|---|---|
| 0 216 032 | 9/1985 | European Pat. Off. . |
| 0 204 926 | 12/1986 | European Pat. Off. . |
| 0 337 671 | 10/1989 | European Pat. Off. . |
| 0 506 318 | 9/1992 | European Pat. Off. . |

*Primary Examiner*—G. Bradley Bennett
*Attorney, Agent, or Firm*—Dickstein Shapiro Morin & Oshinsky LLP

[57] ABSTRACT

A measuring system for a numerical control machine tool comprising a detecting head (3), for contacting a workpiece (1) to be checked and for transmitting an optical coded signal (8) to a remote transceiver unit (11) that, in turn, can transmit an optical switch on signal (10) to the head (3). The transceiver unit (11) is connected, by means of a cable (45) including separate lines (43, 44) for the transmitted and received signals, to an interface unit (12), in turn connected to a computerized numerical control unit (13). In the event that faults occur in the transmission between the head (3) and the interface unit (12), a test takes place so as to identify in which part of the system the fault is located. A test signal is generated by suitable means (38) in the interface unit (12), transmitted from the transceiver unit (11) towards a reflecting surface (16), reflected by the latter, received by the transceiver unit (11) and sent to the interface unit (12). If the test outcome is positive, it means that head (3) is the cause for the malfunction. In the contrary, the test continues, by shortcircuiting the connection lines (43, 44) first to one, then to the other end of cable (45) for excluding from the test the transceiver unit (11), and cable (45) itself.

10 Claims, 3 Drawing Sheets

5,778,550

1

SYSTEM FOR DETECTING LINEAR DIMENSIONS AND METHOD FOR TESTING THE SYSTEM OPERABILITY

TECHNICAL FIELD

The present invention relates to a system for checking the dimensions of mechanical workpieces, including a detecting apparatus and a processing and control unit, the detecting apparatus comprising: a detecting head, for cooperating with the workpiece to be checked, with transmission devices for transmitting first electromagnetic coded signals; a transceiver unit, separate from the head, with a receiving section for receiving the first electromagnetic coded signals, and a transmitting section for transmitting second electromagnetic signals; and an interface unit, connected to the transceiver unit and to the processing and control unit, comprising reception means and means for generating switch on signals.

The invention also relates to a method for testing the operability of a system for checking the dimensions of mechanical workpieces including a detecting head for transmitting first electromagnetic coded signals and a transceiver unit, separate from the head, with a receiving section for receiving the first electromagnetic coded signals and a transmitting section for transmitting second electromagnetic signals.

BACKGROUND ART

In known measuring systems like those applied, for example, in numerical control machine tools for detecting the position and/or the dimensions of machined workpieces a contact detecting head, mounted on the machine, in the course of a checking cycle displaces with respect to the workpiece, touches the surface to be checked and, further to making contact, sends wireless signals to an appropriate receiving unit. The receiving unit is in turn connected, by means of an interface device, to the numerical control unit that, by processing other signals indicative of the position of the head, obtains the information about the position of the workpiece surface.

The system can foresee the head to be power supplied by an electric battery and be kept under normal circumstances in a "stand by" condition of low electric power consumption and that, when there is the need to perform a measuring cycle, a wireless switch on signal be sent by the receiving unit to the transmission circuits of the head to activate the power supply, by means of appropriate switching devices sensitive to the switch on signal. When the measuring cycle ends, the receiving unit sends a wireless switch off signal that brings the head back to the "stand by" low consumption condition.

A system of this type is illustrated and described in US patent U.S. Pat. No. 4,693,110. This patent also discloses a method and an apparatus for testing the operability conditions of the head.

Whenever, in the course of a measuring cycle, there are some doubts about the system operating correctly, in particular whenever transmission between head and interface appears to be interrupted, it is necessary to identify the origin of the malfunction, that may affect the head transmitter, the receiving unit, the interface device, or even the connecting cables.

Under this circumstance all the component parts are inspected until the fault is detected; this involves the testing of the associated circuits by accomplishing delicate operations that foresee the use of appropriate instruments and often the attendance of specialized personnel.

2

DISCLOSURE OF THE INVENTION

Object of the present invention is to provide a system that, in the event a malfunction occurs, can locate in a simple and rapid way which is the faulty component.

This object is achieved by a system wherein the interface unit comprises means for generating test signals, the transmitting section and the receiving section of the transceiver unit being adapted for transmitting associated electromagnetic test signals and for receiving reflected electromagnetic test signals, respectively, for testing the operability of the detecting apparatus.

A further object of the invention is the providing of a particularly simple methodical test of the operability condition of the system.

This further object is achieved by a method comprising the steps of: commanding the transceiver unit to transmit second electromagnetic signals; arranging a reflecting surface next to the transmitting section so as to cause the reflection of the electromagnetic signals towards the receiving section of the transceiver unit; and testing that the receiving section has correctly received the reflected electromagnetic signals.

An important advantage that a system and a method according to the invention provide is that of enabling the user to locate the fault by performing a few simple operations, without there being the need to apply for the assistance of specialized personnel or require specific instrumentation.

BRIEF DESCRIPTION OF THE DRAWINGS

The invention is hereinafter described in more detail with reference to the enclosed sheets of drawings, given by way of non-limiting example only, wherein.

BEST MODE FOR CARRYING OUT THE INVENTION

Figure 1:
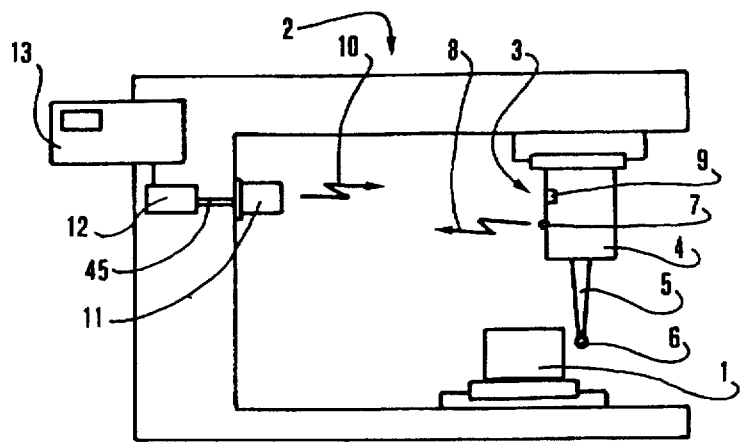
FIG. 1 is an extremely schematic view of a system according to the invention.

FIG. 1 illustrates, in simplified form, a system for detecting linear dimensions of workpieces 1 on a machine tool, for example a machining centre, schematically shown and identified by reference number 2 in the figure, where the pieces are machined. The system comprises, apart from a processing, display and control unit, in particular a computerized numerical control unit 13, that supervises the functioning of the machine tool 2, a detecting apparatus with a detecting head 3. The latter has a support portion 4, coupled to the slides of the machine tool 2, a feeler 6 and an arm 5 carrying the feeler 6 and moving with respect to the support portion 4. The specific arrangement ensures that the support portion 4 of head 3 and the workpiece I be mutually movable. Head 3 also comprises detecting and transmitting devices with at least a generator of electromagnetic signals 8, in particular a light source 7 for emitting infrared optical radiations suitably coded, or modulated, for example, further to contact occurring between the feeler 6 and the workpiece 1. and containing other information like the extent to which an electric power supply battery (not shown in the drawing), housed in the head, is charged. Conversion devices, in particular optoelectronic converters comprising a photodiode 9, are also located in head 3, and transform electromagnetic radiations, or optical signals, 10 ("switch on" signals arriving from a transceiver unit 11 that will be described hereinafter) into electric signals suitably utilized for changing the power supply condition of head 3 in a per se known way; substantially for connecting the transmitting devices housed in the head to the battery.

The detecting apparatus also comprises the previously mentioned transceiver unit 11, and an interface unit 12. The transceiver unit 11 is placed at a distance from head 3, and substantially houses a receiving section for receiving the radiations 8, and a transmitting section for transmitting the radiations 10.

Interface unit 12 is connected to transceiver unit 11, and is in turn connected to the numerical control unit 13 that also receives signals—in a known way, not shown in the figure—indicative of the mutual position existing between head 3 and workpiece 1, for providing information regarding that position at the moment when contact occurs.

Figure 2:
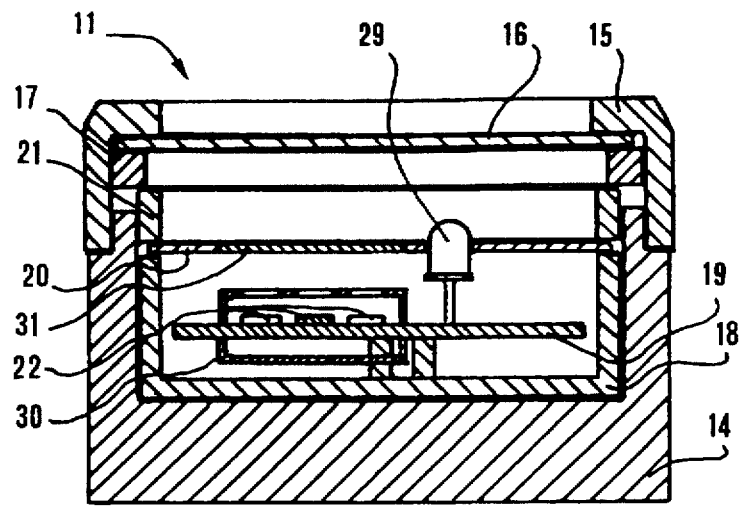
FIG. 2 is an enlarged scale, longitudinal sectional view, angularly displaced by 90°, of a device belonging to the system shown in FIG. 1.
Figure 3:
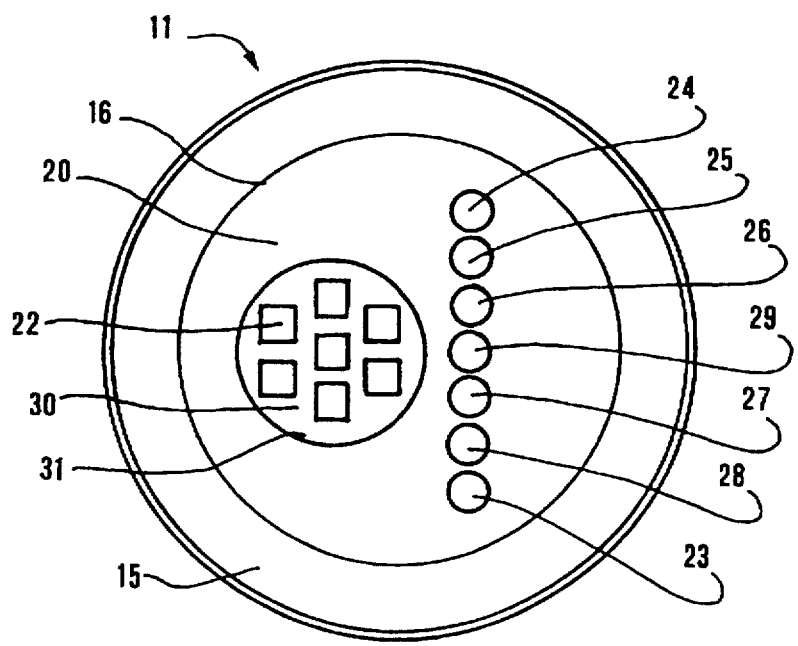
FIG. 3 is a front view of the device of FIG. 2.

Transceiver unit 11, schematically shown in FIGS. 2 and 3, comprises a substantially cylindrical casing 14, and a cover 15 with a circular opening, fixed to casing 14 by means of a threaded coupling. A protection element, more specifically a glass disk 16, closes the opening and is fixed by way of a first threaded ring nut 17, coupled to the internal wall of cover 15.

A metal cup 18 is housed in casing 14 and a support 19 for electric printed circuits is mounted within the interior of cup 18. A metal plate 20 with a substantially circular shape is fixed to casing 14, by way of a second threaded ring nut 21, to close the opening of cup 18, thus featuring an electromagnetic screening for the circuits of support 19.

Support 19 carries, among other components, devices for the optoelectronic conversion with photodiodes connected in parallel and light emitting diodes ("LEDs"). More particularly, in the example shown in FIGS. 2 and 3 there are foreseen seven photodiodes 22 and seven LEDs 23–29. The photodiodes 22 are alike and placed one beside the other, and transform the optical radiations that they receive into electric signals that are thereon suitably amplified and processed by circuits of support 19 and of interface unit 12. LEDs 23–29 accomplish the following functions: visually monitor that the transceiver unit 11 is on (LED 23); visually monitor that a signal has been received by the same unit 11 (LED 24); send switch on signals 10 or other signals (LEDs 25–28); and provide a visual indication that unit 11 is sending signals (LED 29). An element 30 made of metal sheet (for example, of copper), consisting of two parts, provides a further electromagnetic screening of the photodiodes 22 and of other circuits of support 19 at both sides of the same support 19, and defines seven openings at positions corresponding to the photodiodes 22, for enabling the passage of the light signals.

The metal plate 20 defines holes for the passage of LEDs 23–29 and a circular opening located at a position corresponding to the photodiodes 22, that is closed by a film 31 for providing a light filter for allowing the passage of only those radiations that are comprised within the infrared spectrum and preventing other light radiations, also present in the environment and that could generate malfunctions in unit 11, from entering.

Unit 11 does not have focusing elements, nor optical amplification elements, like lenses or concave mirrors, and the infrared radiations 8, transmitted by the light source 7 of head 3, are received, through the glass disk 16, directly by the seven photodiodes 22 that provide, together, a broad sensitive surface.

Figure 4:
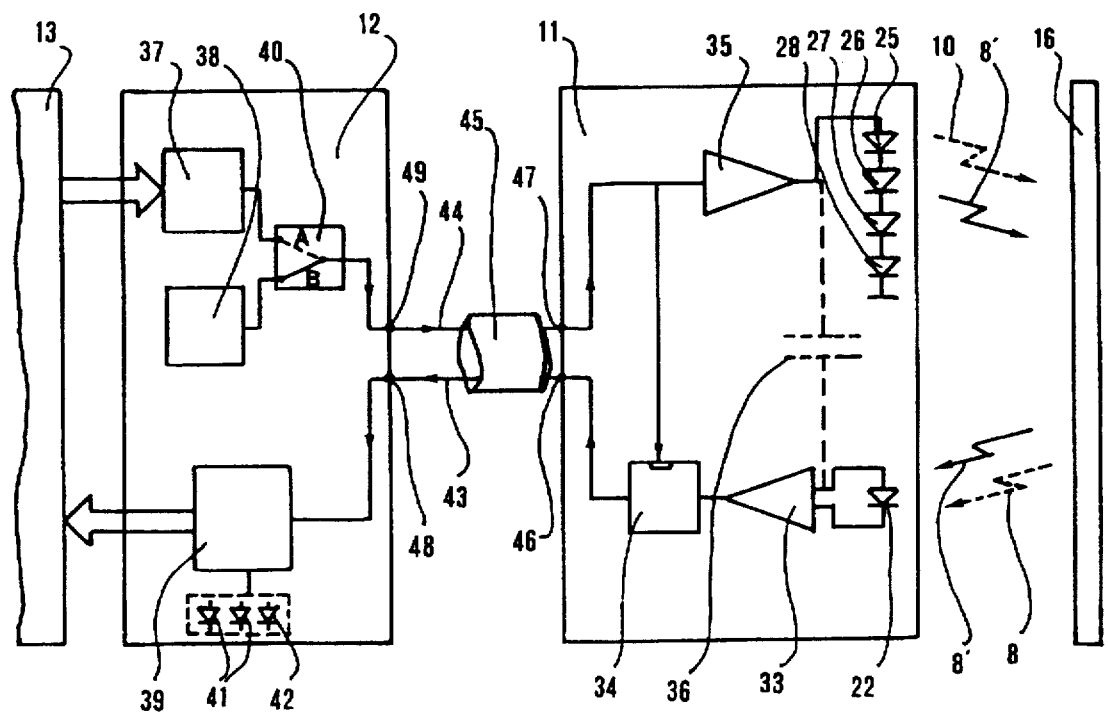
FIG. 4 is a block diagram indicating the functions of some components of the system shown in FIG. 1.

FIG. 4 shows, in an extremely simplified form, the main circuits located on support 19 of the transceiver unit 11, and in the interface unit 12. Each of these circuits may be implemented and function in per se known ways that are not detailedly disclosed in the present description.

The transceiver unit 11 includes an amplifying circuit 33, connected to photodiodes 22, a clipping circuit 34, connected to amplifying circuit 33, and a driving circuit 35, connected to LEDs 25–28, for enabling unit 11 to perform transmission of signals.

Interface unit 12 comprises means for generating electric signals—in particular circuits for generating switch on signals 37 and circuits for generating test signals 38—and reception means comprising decoding circuits 39. Moreover, interface unit 12 comprises switching means, with a switch 40, and LEDs 41, 42 for visually monitoring some of the information contained in the signal received by unit 11 (LED 41), like the contact occurring between feeler 6 and workpiece 1 and the charging extent of the battery arranged within the head, and for monitoring any possible error in the transmission (LED 42), whenever "valid" signals are not being received for a certain time interval (for example 40 ms), in other terms coded signals containing information transmitted by head 3. The decoding circuits 39 are connected, from one side to the clipping circuit 34 of unit 11 through connection means with a first connection line 43 and on the other side to the processing unit 13, in addition to LEDs 41 and 42. Numerical control unit 13 receives information contained in signal 8 further to reception by the photodiodes 22, suitable amplification (33) and clipping (34), as well as information obtained through decoding operations performed by circuits 39. Circuits 37 are connected to processing unit 13 and, by means of selector switch 40 and connection means including a second connection line 44, to the driving circuit 35 of the transceiver unit 11. A control, arriving from the numerical control unit 13, gives rise to a switch on signal generated by circuits 37 and sent to the driving circuit 35 for generating the associated optical signals 10 by LEDs 25–28.

Circuits 38 are also connected—alternatively to circuits 37—to the driving circuit 35 of the transceiver unit 11 by means of selector switch 40 and the second connection line 44.

The two connection lines 43 and 44 include electric conductors comprising wires of a cable 45 connected to units 11 and 12 by means of terminal pins schematically shown for simplification purposes and identified by reference numbers 46, 47, 48 and 49. Terminal pins 46 and 47 provide the coupling between the wires of cable 45 and unit 11 in so far as the first (43) and the second (44) connection lines are concerned, respectively, whereas terminal pins 48 and 49 provide a similar coupling between the wires of cable 45 and interface unit 12.

Under normal operating conditions, selector switch 40 is in a position A (shown by a dashed line in FIG. 4), for connecting the circuits 37 to the second connection line 44. When numerical control unit 13 provides an appropriate control, a signal for switching on head 3 is generated in interface unit 12 and is optically sent through the LEDs 25–28 (signal 10, shown by a dashed line in FIG. 4), as hereinbefore already mentioned. Further to the photodiode 9 receiving the radiations 10, the transmission devices of head 3 are power supplied (in a known way, that does not directly concern this invention), and can transmit suitably modulated, or coded, optical signals 8 (indicated by a dashed line in FIG. 4) indicative, for example, of the position of feeler 6, or of the remaining level of charge of the battery arranged on the head.

When the system fails to operate correctly in the course of the usual operations and LED 42 monitors an error in the transmission, it is possible to rapidly identify which element is causing the fault by following the procedure hereinafter described by making reference to the block diagram shown in FIG. 5.

Block 50: the system is set up to perform the testing procedure by screening the transmission device of head 3, in order to prevent signals 8 from reaching, in this phase, the transceiver unit 11.

Block 51: selector switch 40, possibly of manual type, is displaced to a position B, thus causing the sending of a test signal, generated by circuits 38, through the conductors of the second line 44, to the driving circuit 35: an associated electromagnetic test signal, more specifically, an optical signal 8' is emitted by LEDs 25–28. The optical signal 8' differs from the switch on signal 10, and is under all aspects similar to a signal 8 sent by the transmitter of head 3. The test signal generated by circuits 38 is also sent to the clipping circuit 34, that consequently modifies the associated comparison thresholds in order to diminish the overall sensitivity of the receiving section of unit 11.

Block 52: the optical signal 8' is partially reflected by the surface of the glass disk 16 of transceiver unit 11, and received by the receiving section of unit 11, i.e. by photodiodes 22. Further to simple processings in the amplifying circuit 33 and clipping circuit 34 of the receiving section, an associated signal is sent, through the conductors of the first line 43, to the decoding circuits 39 of interface unit 12.

Block 53: the status of the monitoring LED 42 is checked: if it is on, i.e. it stands to indicate there is an error in the reception of signal 8', this means that there is a fault in the assembly comprising interface unit 12, cable 45 and transceiver unit 11; the testing within this assembly continues (see block 55).

Block 54: if LED 42 is off, i.e. no error is monitored in the transmission, then it is inferred that there is a fault in head 3, owing to the fact that it is the only part of the system excluded from this testing phase.

Block 55: the transceiver unit 11 is insulated, by disconnecting the ends of the wires of cable 45 from terminal pins 46 and 47, and by connecting to each other these ends, in order to shortcircuit the first (43) with the second (44) connection lines: in this way the test signal, generated in the interface unit 12, is electrically sent to the reception means 39 of unit 12.

Block 56: the monitoring LED 42 is checked again: if it is still on, i.e. if there is an error in the reception of the test signal, then there is a fault in the assembly comprising interface unit 12 and cable 45; the testing of this assembly continues (see block 58).

Block 57: if LED 42 is off, i. e. no error is monitored in the transmission, it is inferred that there is a fault in the transceiver unit 11, for the reason that it is the only part of the faulty assembly that is being excluded from the test in this phase.

Block 58: cable 45 is disconnected from the interface unit 12 too, and terminal pins 48 and 49 are connected to each other: in this case, too, the test signal, generated in the interface unit 12, is electrically sent to the reception means 39 of the unit 12.

Block 59: the monitoring LED 42 is checked again.

Block 60: if LED 42 is off, i.e. no error is monitored in the transmission, it is inferred that the fault lies in the cable 45, since this is the only part of the faulty assembly that is being excluded from this testing phase.

Block 61: if LED 42 is on, i.e. an error is monitored in the reception of the test signal, then the fault is to be found in interface unit 12, for the reason that it is the only part undergoing the test in this phase.

Block 62 indicates the end of the test procedure.

The electromagnetic test signal 8' transmitted by LEDs 25–28, further to its generation in circuits 38, has features that are by all means similar to those of an optical coded signal 8 transmitted by light source 7 of head 3. This is necessary because, in order to test the correct operation of the part of the system comprising transceiver unit 11, interface unit 12 and cable 45, it is not sufficient to use the switch on signal 10 generated by circuits 37. As a matter of fact, the switch on signal 10 is generally a plain impulse and in any case does not contain coded information that can be identified by reception means 39; consequently, if possibly the receiving section of the transceiver unit 11 receives a switch on signal 10, interface unit 12 does not identify any "valid" reception signal and indicated an error (LED 42 on).

Figure 5:
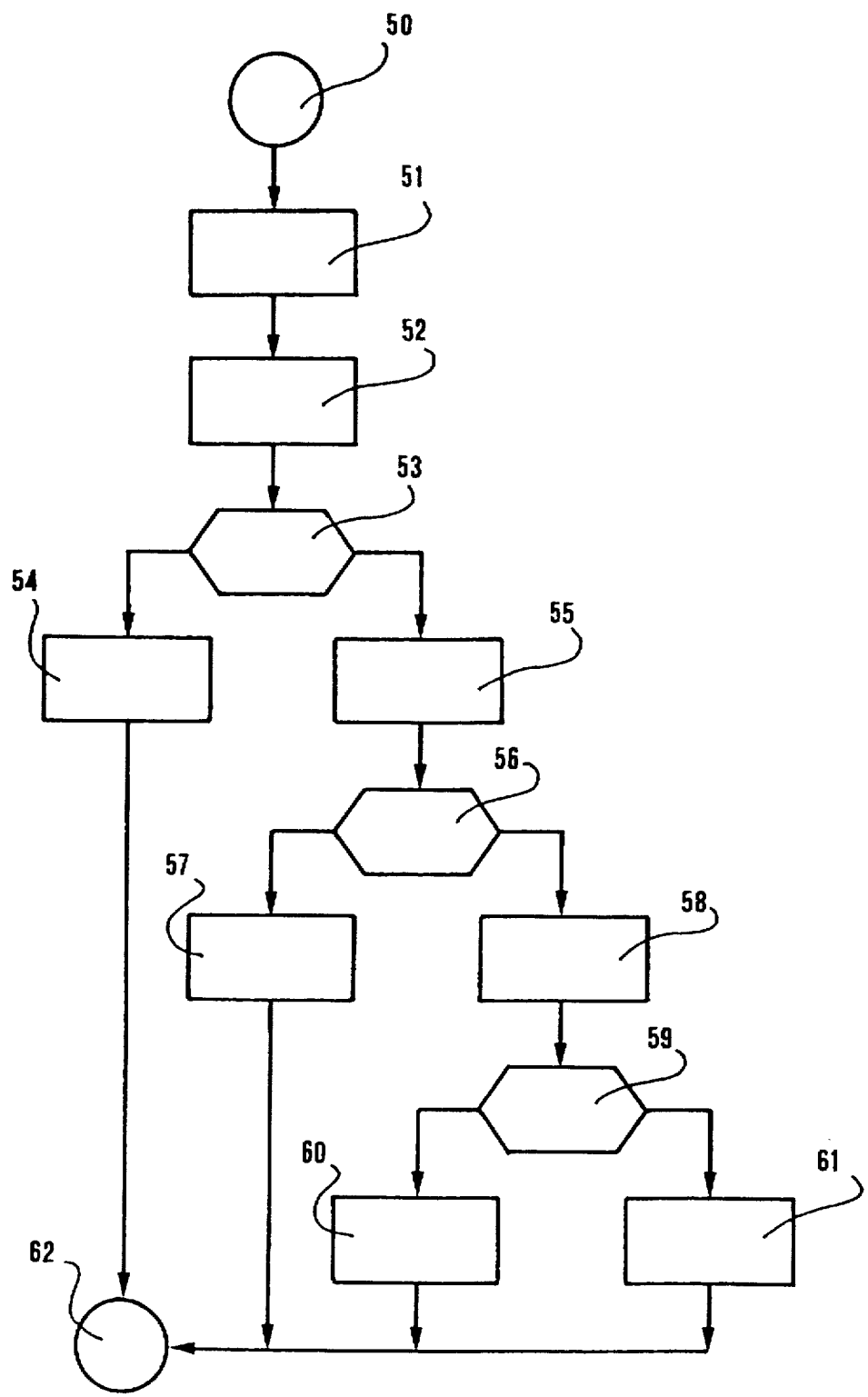
FIG. 5 is a logic block diagram regarding a method according to the invention.

It should be realized that in the illustrated example, even the connection lines 43 and 44 have identical electrical features: this enables to shortcircuit lines 43 and 44 by connecting to each other the wires of cable 45 and/or the terminal pins 48 and 49, according to the hereinbefore described phases identified by blocks 55 and 58 in FIG. 5.

As the receiving and the transmitting sections of the transceiver unit 11 are, in practice, very close together, it is practically inevitable that there occurs a capacitive coupling between the two sections (schematically shown by reference number 36 in FIG. 4) that can cause, in the course of the initial testing phase (blocks 51–53), the passage of the test signal to the receiving section through an unwanted path, thus running the risk of excluding the photodiodes 22 and LEDs 25–28 from the test.

In order to overcome this inconvenience, the overall sensitivity of the receiving section is diminished so that it is not substantially in a condition of detecting relatively weak signals as those that might reach it in an anomalous way (through the capacitive coupling), but can correctly receive just the definitely stronger signals arriving via LEDs 25–28, more specifically electromagnetic test signals 8' reflected by a surface located next to said LEDs 25–28 (for example at a distance of less than 20–30 cm from them). The attenuation means that provide, in practice, the decrease of the sensitivity comprise a suitable connection between the second transmission line 44 and the clipping circuit 34. As previously described (block 51), if the test signal is sent to an appropriate input of the clipping circuit 34, it causes, in a per se known way, a shifting of the comparison threshold of said circuit 34 until the test signal is transmitted, and causes the desired decrease of sensitivity in the course of this phase of the testing procedure.

It should be realized that, under the normal operating conditions of the system, the connection of the second connection line 44 to an input of the clipping circuit 34 causes the sensitivity of the receiving section to diminish when sending a switch on signal: however, it is evident that this does not affect in any way the correct functioning of the system as, during the switch on phase, the features of the receiving section of unit 11 are unimportant.

It should also be realized that there exist other known ways, differing from the one hereinbefore described, for diminishing the sensitivity of the receiving section in the course of the testing phase, for example, by means of circuits adapted for reducing, during said phase, the gain of amplifier 33.

The use of glass disk 16 for partially reflecting the optical test signal 8', emitted by LEDs 25–28, towards the photodiodes 22 (block 52) is particularly convenient, but obviously is not a limitation of the method according to the present invention. In the absence of said glass disk, it is possible to apply a different obstacle—like a sheet of paper, or a hand—in order to provide a suitable reflecting surface.

For an even more accurate test of the operability of the system, there can be performed further additional tests, for example, to test that, in the absence of reflecting surfaces facing LEDs 25–28, and thus in the absence of optical test signals 8', received through the photodiodes 22, an error be monitored by the interface unit 12 (LED 42 on). In the contrary, there could be other reasons determining the malfunction, differing from those that can be tested by following the procedure shown in FIG. 5 (for example a sending back of the test signal owing to the capacitive effect 36, or through other anomalous ways).

There can be foreseen, according to a known method and without making any substantial changes to the system, the possibility of sending wireless "switch off" signals, similar to the "switch on" ones, for switching off the connection between the transmission devices on the head and the associated battery.

The herein described method involves manually performed operations, but there can be foreseen the possibility of automating at least some phases of the test (for example the starting of the procedure, the switching from the circuit 37 generating switch on signals to the circuits 38 for generating test signals, ... ).

Moreover, the circuits, the connections and the whole configuration, shown in a very schematic way in FIG. 4, can be made in different ways. More particularly, and just for the purpose of providing an example: the means 37, 38 for generating the switch on signals and the test signals, and the switching means 40 can be part of a single element of the circuit; the connection lines 43 and 44 can comprise elements that are different from the electric wires of cable 45, like fiber optics; the interface unit 12 can be integrated in the transceiver unit 11, i.e. suitable elements of the latter can accomplish functions that have previously been herein described with reference to the circuits of unit 12.

A different configuration of the system can foresee the use, as a test signal 8', of the actual switch on signal 10. In this case, in interface unit 12 circuits 38 and switch 40 are not present, and the reception means (39) are modified and can detect, further to a suitable switching, when the features of the signal received subsequently to the reflection are substantially identical to those of the transmitted switch on signal.

The test procedure can also be applied, without there being the need for any substantial change, to systems that use the wireless transmission of signals different from optical signals (for example radiofrequency signals).

We claim:

1. System for checking the dimensions of mechanical workpieces (1), including a detecting apparatus and a processing and control unit (13), the detecting apparatus comprising:

a detecting head (3) for cooperating with the workpiece (1) to be checked, with transmission devices (7) for transmitting first electromagnetic coded signals (8), a transceiver unit (11), separate from the head, with a receiving section (22,33,34) for receiving the first electromagnetic coded signals (8), and a transmitting section (25–28,35) for transmitting second electromagnetic signals (8',10), and an interface unit (12), connected to the transceiver unit (11) and to the processing and control unit (13), comprising reception means (39) and means for generating switch on signals (37), characterized in that said interface unit (12) also comprises means for generating test signals (38), the transmitting section (25–28,35) and the receiving section (22,33,34) of the transceiver unit (11) being adapted for transmitting associated electromagnetic test signals (8') and for receiving reflected electromagnetic test signals (8'), respectively, for testing the operability of the detecting apparatus.

2. A system according to claim 1, wherein the detecting apparatus comprises connection means (45) between the transceiver unit (11) and the interface unit (12), with a first connection line (43) between said receiving section (22,33, 34) and said reception means (39), and a second connection line (44), the interface unit (12) comprising switching means (40) for connecting, by means of the second connection line (44), the means for generating switch on signals (37) and, alternatively, the means for generating test signals (38) to said transmitting section (25–28,35).

3. A system according to claim 2, wherein said receiving section (22,33,34) comprises attenuation means connected to the second connection line (44) for decreasing the reception sensitivity of said receiving section (33,34).

4. A system according to claim 2, wherein the detecting apparatus comprises a cable (45) with electric wires for electrically connecting the transceiver unit (11) and the interface unit (12), said first (43) and second (44) connection lines comprising said wires of the cable (45).

5. A system according to one of claims 1–4, wherein the receiving section (22,33,34) and the transmitting section (25–28,35) of said transceiver unit (11) comprise devices for the optoelectronic conversion (22,25–28), said electromagnetic signals (8,8',10) being of optical type.

6. A method for testing the operability of a system for checking the dimensions of mechanical workpieces comprising a detecting head (3) for transmitting electromagnetic coded signals (8), and interface and transceiver means (11,12), separate from the head, with a receiving section (22,33,34) for receiving electromagnetic signals (8), means (38) for generating test signals, and a transmitting section (25–28,35) for transmitting electromagnetic signals (8',10), the method comprising the steps of commanding (51) the interface and transceiver means (11,12) to generate test signals and to transmit associated electromagnetic test signals (8'), arranging a reflecting surface (16) next to said transmitting section (25-28), so as to cause (52) the reflection of the electromagnetic test signals (8',10) towards the receiving section (22) of the interface and transceiver means (11), and testing (53,54) that the receiving section (22,33,34) has correctly received the reflected electromagnetic test signals (8',10).

7. The method according to claim 6, for testing the operability of a checking system, comprising a processing and control unit (13), the interface and transceiver means including a transceiver unit (11) and an interface unit (12), the latter being connected to the processing and control unit

(13) and to the transceiver unit (11) and comprising reception means (39) and said means (38) for generating test signals, the method comprising the step of connecting (51) said means (38) for generating test signals to said transmitting section (25–28,35), for obtaining the transmission of said electromagnetic test signals (8') by the transceiver unit (11) and the reflection (51) of said electromagnetic test signals (8'), and for testing (53,54) that the reception means (39) have correctly received the reflected signals.

8. The method according to claim 7, for testing the operability of a system wherein the transceiver unit (11) comprises a casing (14) and a glass element (16) mechanically coupled to the casing (14), wherein the glass element (16) defines said reflecting surface.

9. The method according to claim 7, for testing the operability of an apparatus with connection means between the transceiver unit (11) and the interface unit (12) including a first (43) and a second (44) connection line, the method comprising the further steps of interrupting (55,58) the connection between the transceiver unit (11) and the interface unit (12), shortcircuiting (55,58) to each other said first connection line (43) and said second connection line (44), and testing (56,57,59,60,61) the correct reception of the test signals, transmitted through the connection lines (43, 44) that are shortcircuited, by the reception means (39) of the interface unit (12).

10. The method according to one of the preceding claims 6 to 9, characterized by the further step of causing a decreasing in the sensitivity of the receiving section (22,33, 34) of the interface and transceiver means (11).

\* \* \* \* \*